5 Sheets—Sheet 1.

L. BOLLMANN.

Assignor to M. BOLLMANN.

Grinding-Machine.

No. 8,497. Reissued Nov. 19, 1878.

Witnesses.
Otto Hufeland
W. C. Hauff

Inventor
Louis Bollmann.
by
Van Santvoord & Hauff
his attorneys.

5 Sheets—Sheet 2.

L. BOLLMANN.

Assignor to M. BOLLMANN.

Grinding-Machine.

No. 8,497. Reissued Nov. 19, 1878.

Witnesses.

Otto Hufeland.

W. C. Hauff.

Inventor.

Louis Bollmann by

Van Santvoord & Hauff his attorneys

L. BOLLMANN.

Assignor to M. BOLLMANN.

Grinding-Machine.

No. 8,497. Reissued Nov. 19, 1878.

Witnesses.
Otto Hufeland
W. C. Hauff.

Inventor.
Louis Bollmann
by
Van Santvoord & Hauff
his attys.

L. BOLLMANN.
Assignor to M. BOLLMANN.
Grinding-Machine.
No. 8,497. Reissued Nov. 19, 1878.
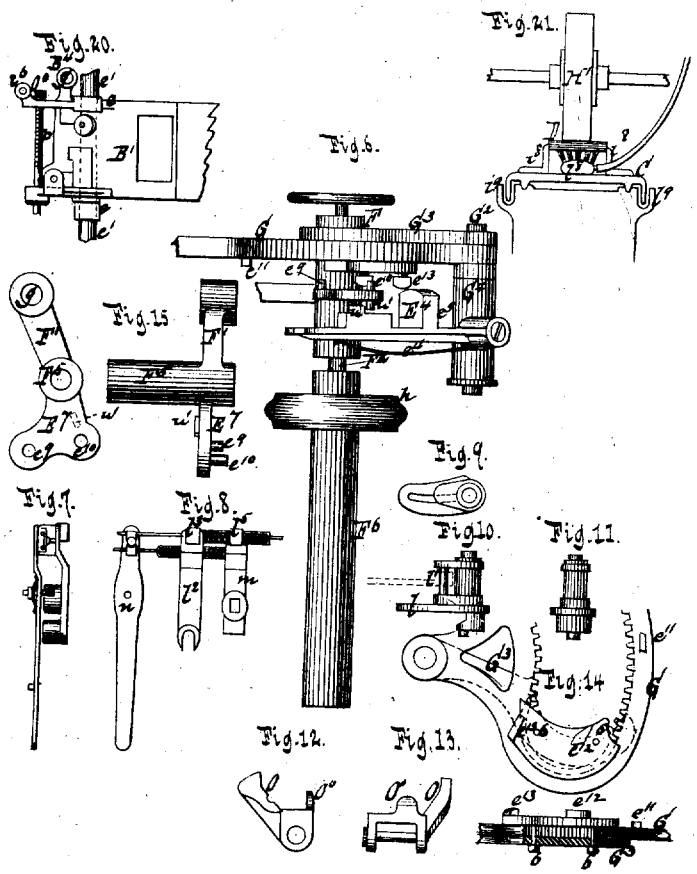
Witnesses.
Otto Hufeland
W. C. Hauff
Inventor.
Louis Bollmann.
by
Van Santvoord & Hauff
his attorneys

L. BOLLMANN.
Assignor to M. BOLLMANN.
Grinding-Machine.
No. 8,497. Reissued Nov. 19, 1878.
Fig. 15a.
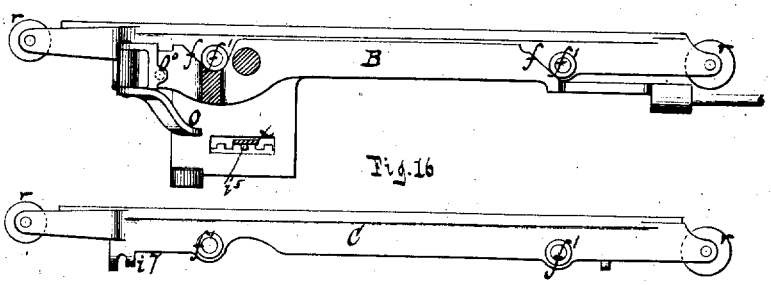
Fig. 16
Fig. 18.
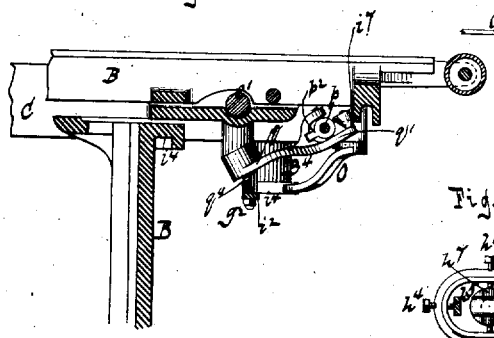
Fig. 17
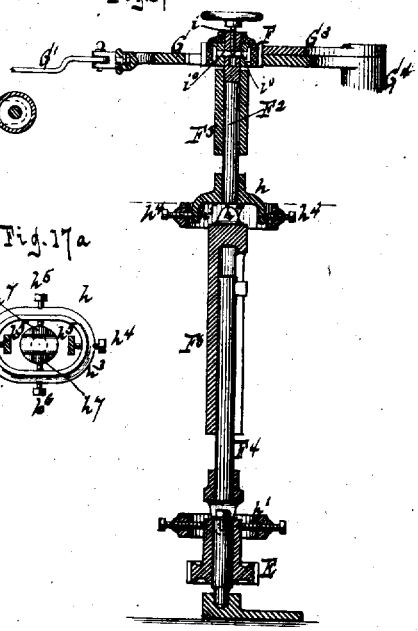
Fig. 17a
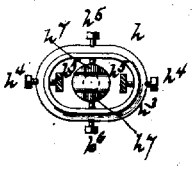
Fig. 19.
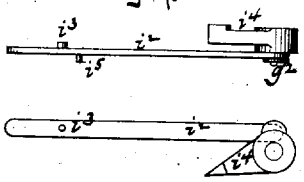
Witnesses.
Otto Hufeland
W. C. Hauff
Inventor
Louis Bollmann.
by
Van Santvoord & Hauff
his attorneys.

UNITED STATES PATENT OFFICE.

LOUIS BOLLMANN, OF VIENNA, AUSTRIA, ASSIGNOR TO MARY BOLLMANN, OF SAME PLACE.

IMPROVEMENT IN GRINDING-MACHINES.

Specification forming part of Letters Patent No. 192,144, dated June 19, 1877; Reissue No. 8,497, dated November 19, 1878; application filed September 19, 1878; patented in England, November 13, 1875.

*To all whom it may concern:*

Be it known that I, LOUIS BOLLMANN, of Vienna, in the Empire of Austria, have invented a new and useful Improvement in Grinding-Machines, which improvement is fully set forth in the following specification, reference being had to the accompanying drawing, in which—

Figure 1:
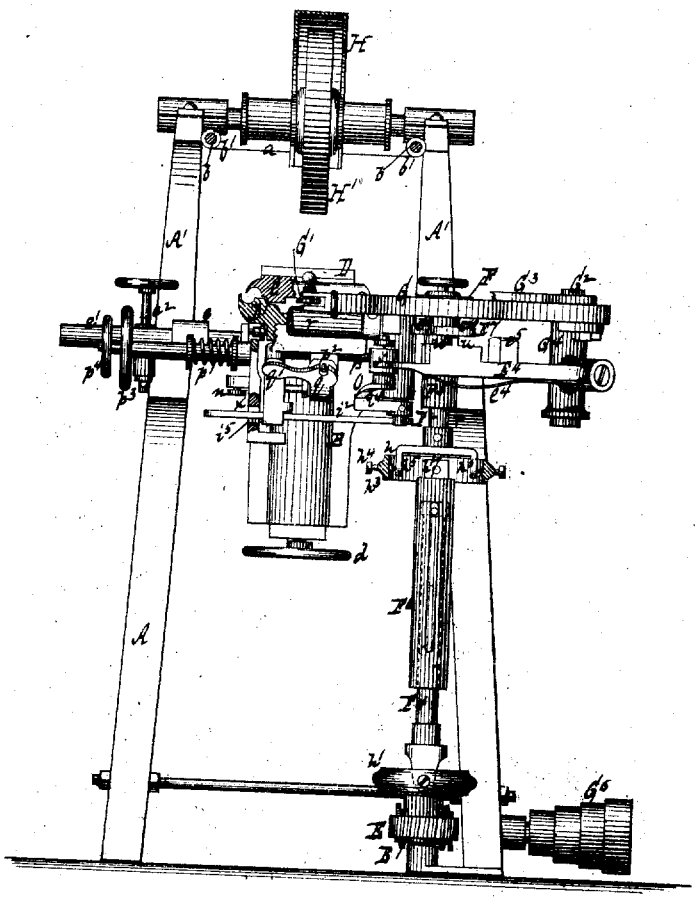
Figure 2:
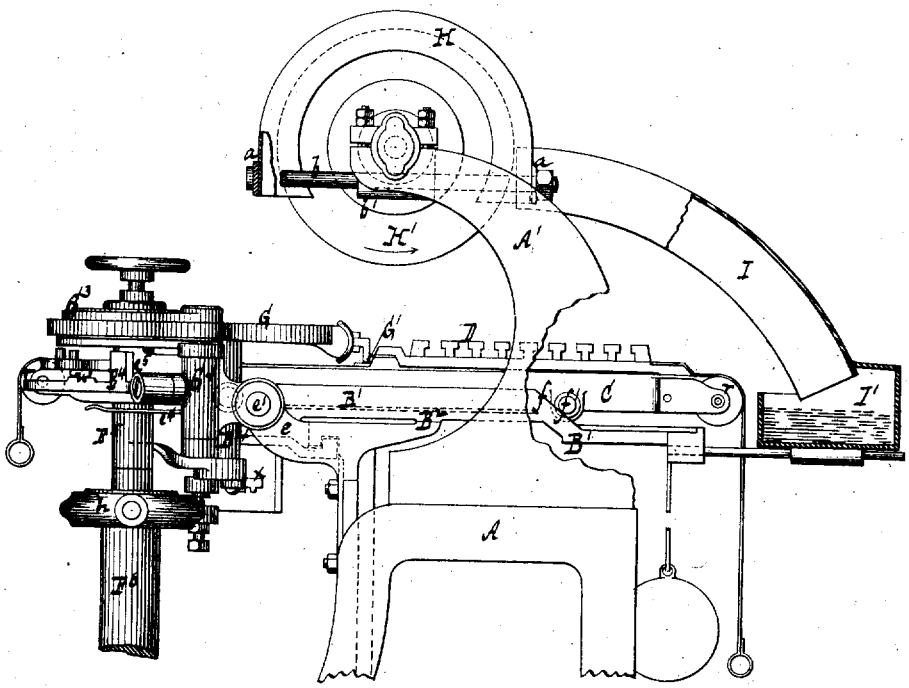
Figure 3:
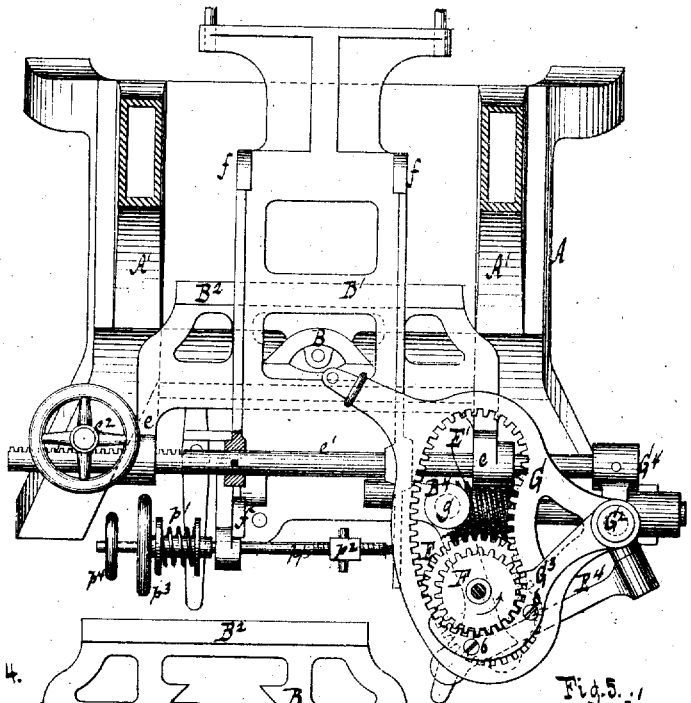
Figure 4:
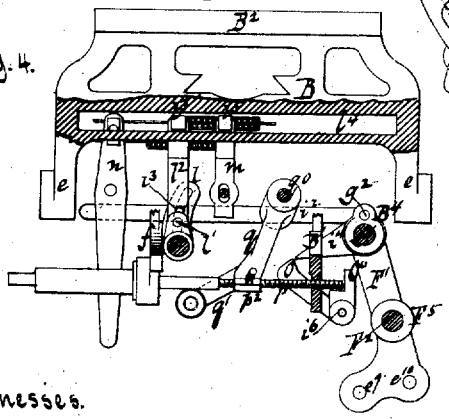

Figure 1 represents a front view, partly in section. Fig. 2 is a side view, on a larger scale than the preceding figure. Fig. 3 is a plan or top view, partly in section, the sliding table and slide-rest being removed to expose the parts below. Fig. 4 is a plan of the mechanism for changing the position of the slide-rest. The remaining figures are details, which will be referred to as the description progresses.

Similar letters indicate corresponding parts.

In the drawing, the letter A designates a frame, which forms the support of my machine. On this frame are secured two arms, A′, provided with bearings, in which the spindle of the grinding-wheel H′ revolves freely. On the upper part of these arms are provided sockets *b′*, Fig. 1, to receive the bolts *b*, which support the elastic steel bars *a a*, Figs. 1 and 2, that carry the protecting-hood H of the grinding-wheel H′. This arrangement of the bolts *b*, the bars *a*, and the hood H is in its nature such that the hood is adapted to yield, and that in case the grinding-wheel bursts the great shock will not break the arms A′, but the force of such shock will be taken up by the spring-bars *a* without doing any harm. Practice has shown that such elastic connection of the hood is the surest way to prevent accidents to the workman and breakage of the machinery. Of course the form of the elastic bars and their connection must be varied according to circumstances, or to the form in which the grinding-wheel is used.

To the main frame A is connected the vertical slide B, which carries the bed $B^1$ and the slide-rest C, and a screw, which is operated by the hand-wheel *d*, Fig. 1, serves to raise and lower said slide, together with the parts which support the work, for the purpose of adjusting the work in the proper relation to the grinding-wheel. Said vertical slide B has two arms, *e e*, provided with eyes, in which slides freely the horizontal bar $e^1$, which supports the front end of the bed $B^1$, Fig. 3, and is provided with cogs, which engage with a pinion mounted on an arbor, $e^2$, Figs. 1 and 3, so that by turning this arbor the bar $e^1$, together with the bed $B^1$, can be moved laterally in either direction, in order to feed the work sidewise under the grinding-wheel.

The rear end of the bed $B^1$ rests upon a plane surface, $B^2$, extending backward from and forming part of the vertical slide B. On the bed $B^1$ are four inclined planes, *f*, Figs. 3 and $15^a$, on which rest the friction-rolls *f′*, which are fastened on two small shafts, that support the horizontal slide-rest C. (See Figs. $15^a$ and 16.) The slide-rest C forms, therefore, a carriage, with four wheels resting on the four inclined planes *f*, and if it is moved forward it has a tendency to rise on these inclines, while when being moved backward it will be lowered, remaining, however, perfectly horizontal in either case.

The sliding table D, on which the work to be ground is fastened, is supported by the slide-rest C, and receives a backward-and-forward motion by a toothed segment-lever, G, to which it is connected by a rod, $G^1$, fastened at one end to the under side of the table, and at its other end to the segment-lever G, Figs. 2 and 17. This segment-lever receives its motion by a pinion, F, which is mounted on a shaft, $F^2$, the upper part of which has its bearing in an eye, $F^5$, on an arm, $F^1$, that swings on a pivot secured in lug $B^4$, which projects from the bed B. (See Figs. 15 and 20.) By means of the arm $F^1$ the pinion F has sufficient play to allow it to remain continuously in gear with the teeth of the segment-lever G. When said pinion is in gear with the long side of the segment-lever, the table D is fed forward, and when it is in gear with the short side of said segment-lever the table is moved backward. Owing to the distances of these toothed sides of the segment from its fulcrum $G^2$, the backward movement of the table is twice as fast as its forward movement.

The length of the motions of the segment-lever G can be regulated by means of a separate toothed arm, $G^3$, which can be turned on the pivot $G^2$, and fastened to the segment-lever G in any desired position by means of set-screws *b*, Fig. 3.

The pivot $G^2$ of the segment-lever G has its bearing in an arm, $G^4$, which is firmly secured to the sliding bar $e^1$, Figs. 2 and 3. The shaft $F^2$ of the pinion F is connected to a slotted tube, $F^6$, by means of a universal joint, $h$, Figs. 1, 17, and $17^a$. This universal joint consists of a ring, $h^3$, which connects by means of two bearing-screws, $h^4$, with lugs $h^5$, projecting downward from shaft $F^2$, and by means of two bearing-screws, $h^6$, with two lugs, $h^7$, which project upward from the tube $F^6$. In this tube slides up and down freely a solid shaft, $F^4$, being connected to said tube by means of a feather-key, so that both must turn together and practically form one shaft, which can be lengthened and shortened, so as to accommodate itself to the changeable position in the height of the slide-rest.

On the lower end of the shaft $F^4$ is another universal joint, $h^1$, which connects to the worm-wheel E, the shaft of which is stepped in a socket in the lower part of the frame A, and receives a continuous motion from a worm, $E^1$, on a horizontal shaft, which is driven from the line-shaft by a belt passing around the pulley $G^5$, Fig. 1.

By means of the universal joints $h$ $h^1$ the shaft $F^2$ of the pinion F is free to accommodate itself to the varying positions of said pinions as the same travel round in the lever-segment G. The mechanism for keeping the pinion F in gear with the lever-segment consists of a locking-bar, $E^4$, pivoted to a stud on the arm $G^4$, which forms the bearing for the lever-segment, said locking-bar being supported in a horizontal position by a flat spring, $e^4$, and being provided with lug $u$, and with a raised projection, $e^5$, Figs. 1 and 6. The lug $u$ engages with a corresponding lug, $u'$, on the under side of an arm, $E^7$, which projects from the eye $F^5$, Fig. 15, that forms the bearing of the shaft of the pinion F. From the upper surface of this arm project lugs $e^9$ $e^{10}$, Figs. 6 and 15, and on the under surface of the lever-segment G are formed guide-flanges $e^{11}$ $e^{12}$ and a cam projection, $e^{13}$, Figs. 6 and 14.

The pinion F revolves in the direction of the arrow shown thereon in Fig. 3, and as the same passes round the outer end of the lever-segment G the cam $e^{13}$ acts on the projection $e^5$, the locking-bar $E^4$ is depressed, and the lug $u$ clears the lug $u'$, Fig. 6, so as to set the arm $E^7$ free and allow it to swing on its pivot $g$. During this time the guide-flange $e^{12}$ engages with the lug $e^{10}$, and the pinion F is retained in gear with the cogs in the outer end of the lever-segment. When the pinion reaches the outer or long side of the lever-segment the cam $e^{13}$ has passed the projection $e^5$, the locking-bar $E^4$ rises, the lugs $u$ $u'$ engage, the arm $E^7$ is locked, and the pinion is retained in gear with the cogs of the long side of the lever-segment, while the work is exposed to the action of the grinding-wheel.

By the time the pinion reaches the inner end of the lever-segment the lugs $u$ $u'$ are again disengaged by the action of the cam $e^{13}$ on projection $e^5$ of the locking-bar, the arm $E^7$ swings on its pivot $g$, and the pinion F is retained in gear with the cogs of the lever-segment by the action of the guide-flange $e^{11}$ against the lug $e^9$. When the pinion F has passed round the inner end of the lever-segment the cam $e^{13}$ has passed the projection $e^5$ of the locking-bar, the lug $u'$ of the arm $E^7$ engages with the opposite side of the lug $u$ of the locking-bar, and the pinion F is retained in gear with the short side of the lever-segment during the time in which the work-supporting table moves back.

It will be seen from this description that during the time the arm $E^7$ remains stationary the pinion F is held in gear with the cogs of the lever-segment by the action of the lugs $u$ $u'$, and during the time when the arm $E^7$ is compelled to swing on its pivot the lugs $u$ $u'$ are disengaged by the depression of the locking-bar $E^4$, and the pinion F is held in gear with the cogs of the lever-segment at one time by the action of the guide-flange $e^{12}$ on the lug $e^{10}$, and at another time by the action of the guide-flange $e^{11}$ on the lug $e^9$. The guide-flange $e^{12}$ and cam $e^{13}$ are secured to the arm $G^3$, so that they follow the motion of this arm when the lever-segment G is shortened or lengthened.

Figure 5:
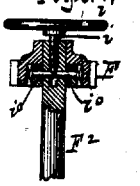

It is essential that the sliding table D can be instantly stopped or set in motion. The pinion F, therefore, is connected to its shaft by a friction-clutch, such as shown in Fig. 5. A pointed screw, $i$, having a hand-wheel, $i^1$, is screwed into the shaft in the direction of its axis, and its conical point enters between the ends of two bolts, $i^0$, which, when forced outward, act against the inner circumference of the hollow pinion, thereby producing sufficient friction to cause the pinion to turn with its shaft. When the screw $i$ is turned back the shaft revolves without the pinion.

The slide-rest C, in addition to its reciprocating motion, has also a lateral movement, which can be increased or diminished, or stopped entirely, and also changed in its direction from right to left or from left to right. The mechanism employed for this purpose is illustrated in Figs. 4 and 18, Fig. 4 being a plan or top view, and Fig. 18 a sectional side view.

In these views the letter B designates the vertical slide. $F^1$ is the swinging arm, provided with the eye $F^5$, which carries the shaft $F^2$ of the pinion F, and which swings on the pivot or shaft $g$, which has its bearing in an arm, $B^4$, projecting from the bed B, Figs. 3 and 20. On the lower end of the shaft $g$ is firmly fastened an arm, $i^4$.

While the pinion F passes round the ends of the lever-segment G, a short swinging motion is imparted to the arm $F^1$, which motion is transmitted to the arm $i^4$. This arm is provided with an eccentric wrist-pin, $g^2$, Figs. 4, 18, and 19, to which is connected a bar, $i^2$, provided with a stud, $i^3$, which works in a curved slot of a lever, $l$, Figs. 4 and 9. By these means the motion of the arm $i^4$ is transmitted to the lever $l$. The outer loose end of the bar $i^2$ extends through a slot, $x$, Figs. 1 and 15[a], in a downwardly-projecting flange of the bed $B^1$, and it is adjusted in this slot by means of a stud, $i^5$, which can be made to engage with different recesses in the bottom part of said slot, so that the pin $i^3$ will engage with the slot of the lever $l$ at a greater or less distance from the fulcrum of said lever. When the pin $i^3$ is close to this fulcrum the motion of the lever $l$ is increased, and vice versa.

The lever $d$ is provided with an eccentric wrist-pin, $l^1$, Figs. 4 and 10, which engages with the forked end of a friction-pallet, $l^2$, Figs. 4 and 8. This pallet carries a square projection, $l^3$, which engages with a long slot or groove, $l^4$, formed on the under surface of the vertical slide B. A similar pallet, $m$, is pivoted to the under side of the bed $B^1$, and made to engage with the slot $l^4$, by means of a projection, $l^5$. Both the pallets, $l^2$ and $m$, are connected by means of two rods and four spiral springs, Fig. 8, to a lever, $n$, which is pivoted to the bed $B^1$, and projects to the front of the machine. When this lever is caused to swing in either direction, the pallets $l^2$ $m$ are forced with an elastic pressure in the opposite direction, causing their projections to catch or become jammed in the slot $l^4$ in one direction, while they move freely in the other direction, on the principle which is generally employed in the feed-wheels of the Howe sewing-machines. The pallet $m$ serves simply to prevent a backward movement of the bed. By setting the lever $n$ to the left or to the right, therefore, the lateral motion imparted to the bed $B^1$ and to the parts supported by it can be changed, and by bringing the lever $n$ in the position shown in Fig. 8 no lateral motion is produced. The amount of the lateral motion is changed by adjusting the rod $i^2$, as already described, the motion of the pallet $l^2$ being dependent upon the motion of the lever $l$.

When the table with the work moves backward in the direction of the motion of the grinding-surface, said table is slightly lowered, while it is raised to bring the work in contact with the grinding-surface when moving forward. At the same time it is desirable that the grinding-wheel shall act on the work with a yielding or elastic pressure, which can be regulated at will, according to the nature of the work. These objects are attained by the following means: The arm $i^4$ acts against a lever, O, Figs. 4, 12, 13, and 18, which turns in an eye, $i^6$, Figs. 18 and 20, on the bed $B^1$, so that a small motion is imparted to it at the moment when the pinion F travels round the inner end of the lever-segment G. The lever O is provided with a toe, $O^0$, against which bears the end of the screw-spindle $p$, Fig. 4, which works in two arms projecting from the bed $B^1$, Fig. 3, and is pressed toward the toe $O^0$ by a spiral spring, $p^1$. On the screw part of this spindle is fitted a nut, $p^2$, to which a lever, $q$, is connected. This lever has its fulcrum on a stud, $q^0$, secured to the under side of the bed $B^1$, and it is provided with an extension, $q^1$, which carries a friction-roller, that bears against the inner edge of a projection, $i^7$, forming part of the slide-rest C, Figs. 16 and 18.

When the toe $O^0$ is moved against the spindle $p$, the friction-roller on the extension $q'$ of the lever $q$ is moved back, the slide-rest C is allowed to sink slightly downward on the four inclines $f$ of the bed $B^1$, and the work is lowered so that the grinding-wheel does not touch it. When the lever O is set free, the spring $p^1$ causes the screw-spindle $p$ to follow the toe $O^0$, and by the action of the extension $q^1$ on the projection $i^7$ the slide-rest is raised on the four inclines, being retained by the tension of the spring $p^1$, so that when the pressure of the grinding-wheel against the work exceeds a certain limit the slide-rest is pushed down, and accidents are avoided. The tension of the spring $p^1$ can be regulated by the hand-screw $p^3$, Fig. 3. A hand-wheel, $p^4$, serves to turn the spindle $p$, thereby changing the position of the nut $p^2$ and of the lever $q$ $q^1$, so as to set the slide-rest higher or lower, and to adjust the same to suit the work to be ground, while the range of the small upward and downward motion at each stroke will remain the same.

On the front and back ends of the slide-rest C are two rollers, $r$, Figs. 2, 15[a], and 16, over which pass two aprons, of leather or cloth, which are fastened to the ends of the sliding table D, and have weights attached to them to keep them stretched. They serve to protect the mechanism below and the slides from dust produced during the grinding operation.

To carry off this dust, and also the metal ground away, there is a screen, I, of sheet metal, placed behind the grinding-wheel, (see Fig. 2,) and made in such a shape that it catches the stream of metal chips and dust produced by the grinding operation, and leads the same directly into the vat I′, which is filled with water.

To prevent certain kinds of work from getting unduly heated by the action of the grinding-wheel, I use the arrangement shown in Fig. 21, where the letter C designates the slide-rest, which supports the table D, on which is secured the work to be exposed to the action of the grinding-wheel H′. Said table is provided with raised flanges or brackets $i^3$, between which the work can be fastened in such a position that a free space is left between the upper surface of the table and the under surface of the work. Into this space is placed a hollow vessel or tube, $l^8$, connected by a flexible hose with a reservoir or tank filled with water and placed in an elevated position. The vessel or tube $l^8$ is perforated with a large number of small holes, through which fine jets of water are thrown against the under surface of the work, whereby the latter is kept cool while being ground. The waste-water runs off over the sides of the table into troughs or channels $l^9$, formed on the slide-rest, whence it escapes through suitable tubes.

What I claim as new, and desire to secure by Letters Patent, is—

1. In a grinding-machine, the combination of the supports of the grinding-disk with a protecting-hood applied to spring-bars or springs to take up the shock of a bursting disk, substantially as described.

2. In a grinding-machine, the combination, with the work-supporting reciprocating bed or table, and with the grinding-disk, of mechanism for increasing automatically the distance between the bed and the grinding-disk when the bed moves in one direction, and for diminishing said distance when the bed moves in the opposite direction, substantially as and for the purpose set forth.

3. In a grinding-machine, the combination, with the work-supporting reciprocating table, with the grinding-disk, and with mechanism for increasing and diminishing the distance between said table and grinding-disk, as described, of elastic cushions or springs to allow the table to yield if the pressure of the grinding-disk on the work exceeds a certain limit, substantially as set forth.

4. The combination, with the work-supporting reciprocating table C, having friction-rollers, of the bed $B^1$, having inclines, whereby the table is adapted to be raised or lowered, substantially as shown and described.

5. The combination, with the work-supporting reciprocating table, of the toothed segment-lever G, with the continuously-revolving gear-wheel F, and the adjustable toothed section $G^3$, to lengthen and shorten the stroke of the reciprocating table, substantially as described.

6. The combination, with the reciprocating table, the mechanism for lengthening and shortening its stroke, and the vertically-adjustable slide-rest which supports said table, of mechanism adapted to follow the up-and-down motion of the slide-rest, substantially as described.

7. The combination, with the slide-rest, of friction-pallets and lever mechanism, arranged to operate in both directions to produce automatic side motion of the slide-rest, substantially as set forth.

8. The combination, with the slide-rest C, and with its end rollers, of covering-aprons to protect the mechanism below against dust, substantially as set forth.

9. The combination, in a grinding-machine, of a vertically-sliding support, B, a swinging bed, $B^1$, seated thereon, a rising and falling slide-rest, and a reciprocating work-supporting table, all constructed and adapted to operate substantially as and for the purpose set forth.

10. The combination, with the work-supporting table, of a perforated pipe connected to a hose, said table being adapted to support the work above the perforated pipe, substantially as and for the purpose described.

In testimony that I claim the foregoing I hereunto set my hand and seal this 21st day of August, 1878.

LOUIS BOLLMANN. [L. S.]

Witnesses:
HEINRICH LAULA,
A. HEINRICHSHOFEN.